US010110593B2

(12) United States Patent
Karroumi et al.

(10) Patent No.: US 10,110,593 B2
(45) Date of Patent: Oct. 23, 2018

(54) DEVICE AND METHOD CERTIFICATE GENERATION

(71) Applicant: THOMSON LICENSING, Issy de Moulineaux (FR)

(72) Inventors: Mohamed Karroumi, Rennes (FR); Olivier Courtay, Rennes (FR)

(73) Assignee: Thomson Licensing, Issy-les-Moulineaux (FR)

( * ) Notice: Subject to any disclaimer, the term of this patent is extended or adjusted under 35 U.S.C. 154(b) by 48 days.

(21) Appl. No.: 14/611,771

(22) Filed: Feb. 2, 2015

(65) Prior Publication Data

US 2015/0222628 A1 Aug. 6, 2015

(30) Foreign Application Priority Data

Feb. 5, 2014 (EP) .................................... 14305158

(51) Int. Cl.
| | | |
|---|---|---|
| *H04L 29/06* | (2006.01) | |
| *H04L 9/32* | (2006.01) | |
| *G06F 21/31* | (2013.01) | |
| *G06F 21/33* | (2013.01) | |
| *G06F 21/44* | (2013.01) | |

(52) U.S. Cl.
CPC .......... *H04L 63/0823* (2013.01); *G06F 21/31* (2013.01); *G06F 21/33* (2013.01); *G06F 21/445* (2013.01); *H04L 9/3226* (2013.01); *H04L 9/3247* (2013.01); *H04L 9/3263* (2013.01); *H04L 63/083* (2013.01)

(58) Field of Classification Search
CPC . H04L 63/0823; H04L 63/083; H04L 9/3263; H04L 9/3247; H04L 9/3226; H04L 9/3265; H04L 9/3268; G06F 21/445; G06F 21/31; G06F 21/33
USPC ......................................... 713/168, 169, 175
See application file for complete search history.

(56) References Cited

U.S. PATENT DOCUMENTS

| | | | |
|---|---|---|---|
| 6,310,966 B1 * | 10/2001 | Dulude ................. | G06Q 20/04 382/115 |
| 7,047,408 B1 | 5/2006 | Boyko et al. | |
| 7,243,236 B1 * | 7/2007 | Sibert .................... | G06F 21/51 380/255 |
| 7,602,910 B2 | 10/2009 | Johansson et al. | |
| 7,958,368 B2 | 6/2011 | Dewey et al. | |
| 8,418,235 B2 | 4/2013 | Sherkin et al. | |

(Continued)

OTHER PUBLICATIONS

Biometric Certificate Based Biometric Digital Key Generation with Protection Mechanism, Chung et al, 10.1109/FBIT.2007.151, IEEE, (Year: 2007).*

(Continued)

*Primary Examiner* — Jahangir Kabir
(74) *Attorney, Agent, or Firm* — Myers Wolin LLC

(57) ABSTRACT

A device receives a password from a user, obtains a public key for a cryptographic algorithm for the device, obtains a password verifier by applying a one-way function to a combination of a unique identifier, the password and the public key, generates the certificate comprising the unique identifier, the public key and the password verifier, signs the certificate using a private key corresponding to the public key thereby obtaining a self-signed certificate, and outputs the self-signed certificate. Also provided is the device.

6 Claims, 2 Drawing Sheets

Figure 2

(56) References Cited

U.S. PATENT DOCUMENTS

| | | | |
|---|---|---|---|
| 2005/0086504 A1* | 4/2005 | You | H04L 63/0435 |
| | | | 713/193 |
| 2006/0104441 A1* | 5/2006 | Johansson | G06F 21/31 |
| | | | 380/44 |
| 2007/0136800 A1 | 6/2007 | Chan et al. | |
| 2009/0183000 A1* | 7/2009 | Krig | H04L 63/0442 |
| | | | 713/168 |
| 2009/0222901 A1 | 9/2009 | Schneider | |
| 2013/0132721 A1* | 5/2013 | Busser | H04L 9/08 |
| | | | 713/168 |
| 2016/0036589 A1* | 2/2016 | Toyoizumi | G06F 21/33 |
| | | | 713/168 |
| 2016/0094348 A1* | 3/2016 | Takahashi | H04L 9/0866 |
| | | | 713/175 |

OTHER PUBLICATIONS

Harkins: "Simultaneous Authentication of Equals: A Secure, Password-Based Key Exchange for Mesh Networks"; 2008 Second International Conference on Sensor Technologies and Applications (SENSORCOMM)—Aug. 25, 2008; pp. 840-844.

Luo Etal: "Providing Robust and Ubiquitous Security Support for Mobile Ad-Hoc Networks"; Proceedings Ninth International Conference on Network Protocols. ICNP 2001—Nov. 14, 2001; pp. 1-21.

Wu: "RFC 2945 The SRP Authentication and Key Exchange System"; Sep. 1, 2000—http://www.faqs.org/rfcs/rfc2945.html; pp. 1-7.

Search Report dated Jul. 11, 2014.

\* cited by examiner

DEVICE AND METHOD CERTIFICATE GENERATION

This application claims the benefit, under 35 U.S.C. § 119 of European Patent Application No. 14305158.9, filed Feb. 5, 2014.

TECHNICAL FIELD

The present disclosure relates generally to computer network security and in particular authentication of devices in such networks.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

There are many scenarios in which two devices need to interact to exchange data. A common case occurs when a single user controls the devices, e.g. a laptop and a wireless access point. In this case, the communication passes over a wireless communication channel that is relatively easy to eavesdrop. Therefore, it is important to ensure that this channel is secure, in particular when sensitive data is to be transmitted. While the wireless channel will be used as an example, it will however be appreciated that this also applies, but often to a lesser extent, to wired connections.

In these cases, it is common that there is no prior trust infrastructure. This opens the door for the so-called man-in-the-middle attacks. Mitigation of this attack requires some level of user involvement in the device enrolment process. Prior art solutions comprise different methods as button protocols and the use of visual channels (e.g. a first device can have a bar code that the user scans with the second device and the information is used to generate a session key). Such methods engage the user in interacting with the devices communicating over the wireless channel. This is the basis of forming a secure connection between devices in ad hoc networks.

Most applications today employ Transport Layer Security (TLS) protocol for providing secure connections. Conventional options available for authenticating the user include pre-shared key, passwords or public-key certificates. However, there are only a few applications that employ client-side public key certificates for user authentication. In fact, the deployment and management of certificates has turned out to be the main issue.

There exist solutions that combine a password and a certificate for authenticating a user. These methods generally work as follows: when the user is provided with a certificate and a private key, he is directed to input a password. The password is used for the secure storage of the private key and permits minimizing the risks of the certificate being lost or stolen. Then, during a TLS session, the user is requested to enter the password again in order to "unlock" the digital certificate for use. The password is given as evidence of possession of the private key associated to the digital certificate.

A man-in-the-middle ("MITM") attack or impersonation is a type of attack on mutual authentication protocols in which an attacker makes independent connections with two devices and relays messages between them. The attacker in a MITM attack is usually invisible, and impersonates the devices making them believe they are communicating directly with one another over a secure connection. The attacker, however, controls the entire communication. MITM attacks may be devastating. If, a user authenticates himself to the MITM, then he reveals his credentials and the attacker can misuse them to spoof the user.

Many authentication mechanisms fail to provide enough protection against MITM or impersonation attacks. There are two main reasons:
1. The user-authentication mechanism used is usually weak. This leads to a situation in which the user talks to the MITM, thereby revealing his password,
2. The TLS session establishment is generally decoupled from the user authentication. If for instance a shared secret-key leaks, it can be reused to spoof any device in a network.

Consequently, any effective countermeasure against MITM attacks must address these problems by implementing a secure authentication mechanism that combines user authentication with TLS certificate-based authentication.

RFC 2945, "The SRP Authentication and Key Exchange System", describes a Secure Remote Password (SRP) algorithm that enables set-up of authentication based on passwords. The client has a password or PIN code and the server has a verification data (e.g. the salted hash of the password). SRP provides strong mutual authentication. However, SRP is not always supported or available. Datagram TLS (DTLS), which is the reference for protecting data over UDP, does not support SRP authentication; only certificate-based and pre-shared key authentication are currently supported.

A first problem with the prior art methods is that when password verification is local to a device it cannot be trusted because of a possibly weak security enforcement mechanism. This may be harmful for the system infrastructure. The reason is that in such a case, an attacker can bypass the password enforcement on a weak device and then get access to critical resources. It will thus be seen that there is a need for a solution in which the remote device (i.e. the verifier) not only verifies that the user possesses the private key but also that he knows the correct password.

A second problem with the prior art methods, is the centralized nature and complexity of setting up a PKI infrastructure. The scalability (addition of new devices) within such systems requires a management service for the signature and delivery of new certificates. This has a cost and is not easy to set-up or use, especially for a user without any security knowledge. In many cases, particularly for ad hoc networks, there is no central authority or management server and devices generate self-signed certificates. Since any device then can generate a certificate, it is difficult to trust such certificates. We address the issue here by proposing a secure and decentralized PKI system based on the knowledge of a unique password. This renders the deployment and management of certificates completely transparent for the user. The user needs only to remember the password.

It will thus be appreciated that there is a need for a solution that ensures that a certificate not only permits remote password verification, but also that the certificate was generated by a user device under control of a user that knows the password. The present disclosure provides such a solution.

SUMMARY

In a first aspect, the present disclosure is directed to a device for generating a certificate. The device comprises an interface configured to receive a user data and a processor configured to obtain a public key for a cryptographic algorithm for the device, obtain a verifier by applying a function to a combination of a value based on the user data and the public key, generate the certificate comprising the public key and the verifier, obtain a signature on the certificate thereby obtaining a signed certificate, and output the signed certificate.

In a first embodiment, the processor is further configured to obtain the verifier by applying the function to a combination of a unique identifier, the value based on the user data and the public key, and to include the unique identifier in the certificate. It is advantageous that the unique identifier is a unique identifier for at least one device or for at least one resource.

In a second embodiment, the function is a one-way function or an encryption function.

In a third embodiment, the user data is a password.

In a fourth embodiment, the value based on the user data is identical to the user data.

In a fifth embodiment, the cryptographic algorithm is RSA and the public key comprises a modulus.

In a sixth embodiment, the cryptographic algorithm is an elliptic curve cryptography algorithm and the public key comprises a generator and a first modulus.

In a seventh embodiment, the processor is configured to obtain the signature by signing the certificate using a private key corresponding to the public key.

In a second aspect, the present disclosure is directed to a method for generating a certificate. A processor of a device receives user data, obtains a public key for a cryptographic algorithm for the device, obtains a verifier by applying a function to a combination of a value based on the user data and the public key, generates the certificate comprising the public key and the verifier, obtains a signature on the certificate thereby obtaining a signed certificate, and outputs the signed certificate.

In a first embodiment, the value based on the user data is identical to the user data.

In a second embodiment, the generating comprises obtaining the verifier by applying a function to a combination of a unique identifier, the value based on the user data and the public key, and to include the unique identifier in the certificate.

In a third embodiment, the unique identifier is a unique identifier for at least one device or for at least one resource.

In a fourth embodiment, the function is a one-way function or an encryption function.

In a fifth embodiment, the user data is a password.

BRIEF DESCRIPTION OF DRAWINGS

Advantageous features of the present disclosure will now be described, by way of non-limiting example, with reference to the accompanying drawings, in which.

DESCRIPTION OF EMBODIMENTS

Figure 1:
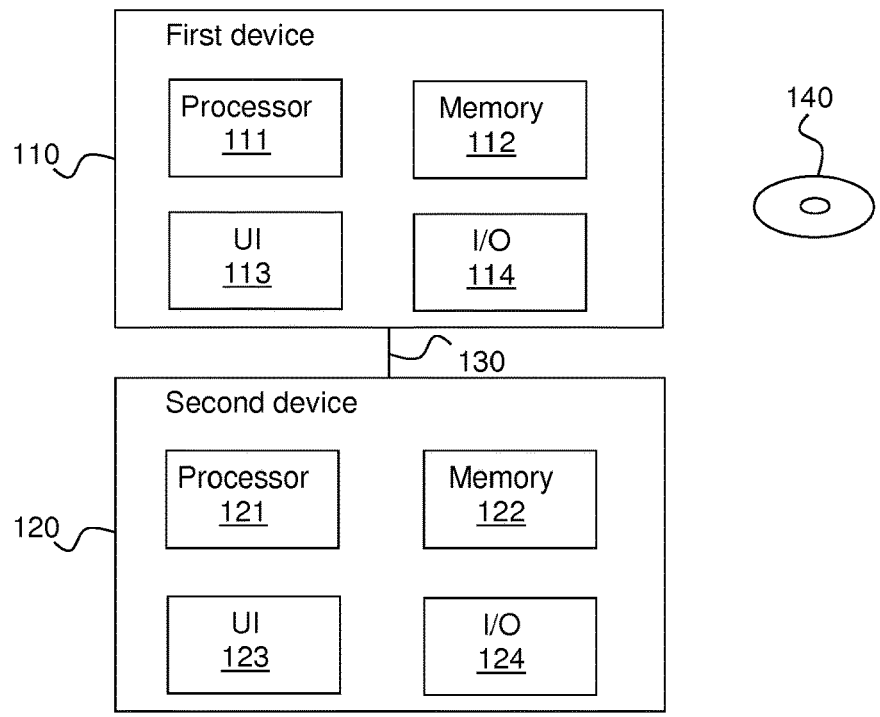
FIG. 1 illustrates an exemplary system in which the present disclosure is implemented.

FIG. 1 illustrates an exemplary system 100 in which the present disclosure is implemented. The system 100 comprises a first computing device ("first device") 110 and a second computing device ("second device") 120. The first and second devices 110, 120 can be any kind of suitable computer or device capable of performing calculations, such as a standard Personal Computer (PC), a workstation, a Smartphone and a tablet. The first and second devices 110, 120 each preferably comprise at least one processor 111, 121, internal or external memory 112, 122, a user interface 113, 123 for interacting with a user, and a second interface 114, 124 for interaction with other devices over connection 130. The first and second devices 110, 120 each also preferably comprise an interface (not shown) for reading a software program from a digital data support 140 that stores instructions that, when executed by a processor, performs any of the methods described hereinafter. The skilled person will appreciate that the illustrated devices are very simplified for reasons of clarity and that real devices in addition would comprise features such as power supplies and persistent storage.

Briefly speaking, a salient idea of the present disclosure is the ability of a device to generate a certificate for which the anchor of trust is based on user data (instead of, for example, an external trusted Certification Authority). The user data can for example be a password (which will be used hereinafter as a non-limitative example), a pass phrase or biometric data When a user wishes to enroll a new device into the user's cluster of devices (i.e. devices that, when connected, are part of the ad hoc network), it is necessary to generate a certificate for the new device. The enrollment process is based on the knowledge of a password that the user chooses before installation of the first device. Then, for each new device, the password is requested again and verified against a password verifier that is generated and stored on each device during enrollment of the device. It will be appreciated that use of the password prevents enrollment of unauthorized devices. In addition to the password verifier, each enrolled device generates a self-signed certificate for a public key and an associated private key. The public key may be obtained in any suitable way: it may be generated by the device or received from a further device, and it may be generated or received when needed or retrieved from memory.

However, in order to provide security, it should not be possible to generate a valid self-signed certificate unless the correct password is provided. To this end, the certificate securely binds the public key of the certificate and the password and the resulting 'binding' is then inserted in the certificate and used as a password verifier. The certificate can then be output to a further device or to internal or external memory.

The binding is preferably made using a, preferably one-way, function F operating on a combination, advantageously a concatenation, of the password and the public key or a concatenation of at least one unique identifier (uid) for a device or a resource, the password and the public key:

Password verifier=F(password|public key) or F(uid|password|public key)

The unique identifier can be for a group of files stores on one or more devices or for a group of devices to which the user can have access. This can for example make it possible to have two privilege levels such as "root" and "user", where the former has full access rights and where the user has limited access (i.e. to the device or resource defined by the at least one unique identifier).

The function F can be any suitable, preferably cryptographic, one-way function in the art, for example a hash function such as SHA-1 and SHA-3 or an encryption function.

In the case of RSA, the public key is represented by a public exponent e and a modulus N and the password verifier is preferably calculated in one of the following ways:

Password verifier=F(password|(N,e)) or F(uid|password| (N,e))

Password verifier=F(password|N) or F(uid|password|(N, e))

In the case of DSA (Digital Signature Algorithm) and elliptic curve cryptography, the public key includes also the public parameters (i.e. the two moduli p,q and the generator $g^x$), and the password verifier is preferably calculated in one of the following ways:

Password verifier=F(password|($g^x$,p,q)) or F(uid|password|($g^x$,p,q))

Password verifier=F(password|($g^x$,p)) or F(uid|password| ($g^x$,p)).

Since the password verifier can be made public, it can be added to the certificate before it is self-signed.

Figure 2:
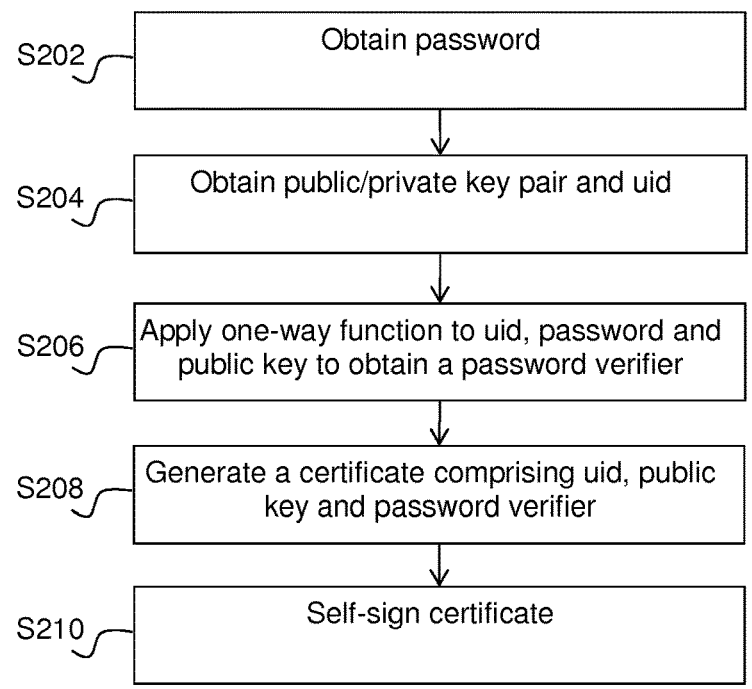
FIG. 2 illustrates certificate generation according to an advantageous embodiment of the present disclosure.

FIG. 2 illustrates certificate generation according to an advantageous embodiment of the present disclosure. The certificates comprise a Distinguished Name (DN), a cryptographic public key and a password verifier PV. The DN field of the certificate can be set to the unique identifier (like a serial number, a MAC Address, or a unique resource identifier).

It will be appreciated that many of the steps can be performed in a different order. As an example, the method is performed on the first device 110.

1. The first device 110 obtains S202 a password, normally through user input.
2. The first device 110 obtains S204 a public/private key pair and a unique identifier (uid). These are preferably generated by the device itself, but it can also be provided from the user or another device.
3. The first device 110 applies S206 the function F to the unique identifier, the password and the public key to obtain the password verifier.
4. The first device 110 generates S208 a certificate comprising the unique identifier, the public key and the password verifier.
5. The first device 110 self-signs S210 the certificate using the private key.

It is also possible for the device to request another device to generate the signature on the data, normally using the private key of the other device.

Figure 3:
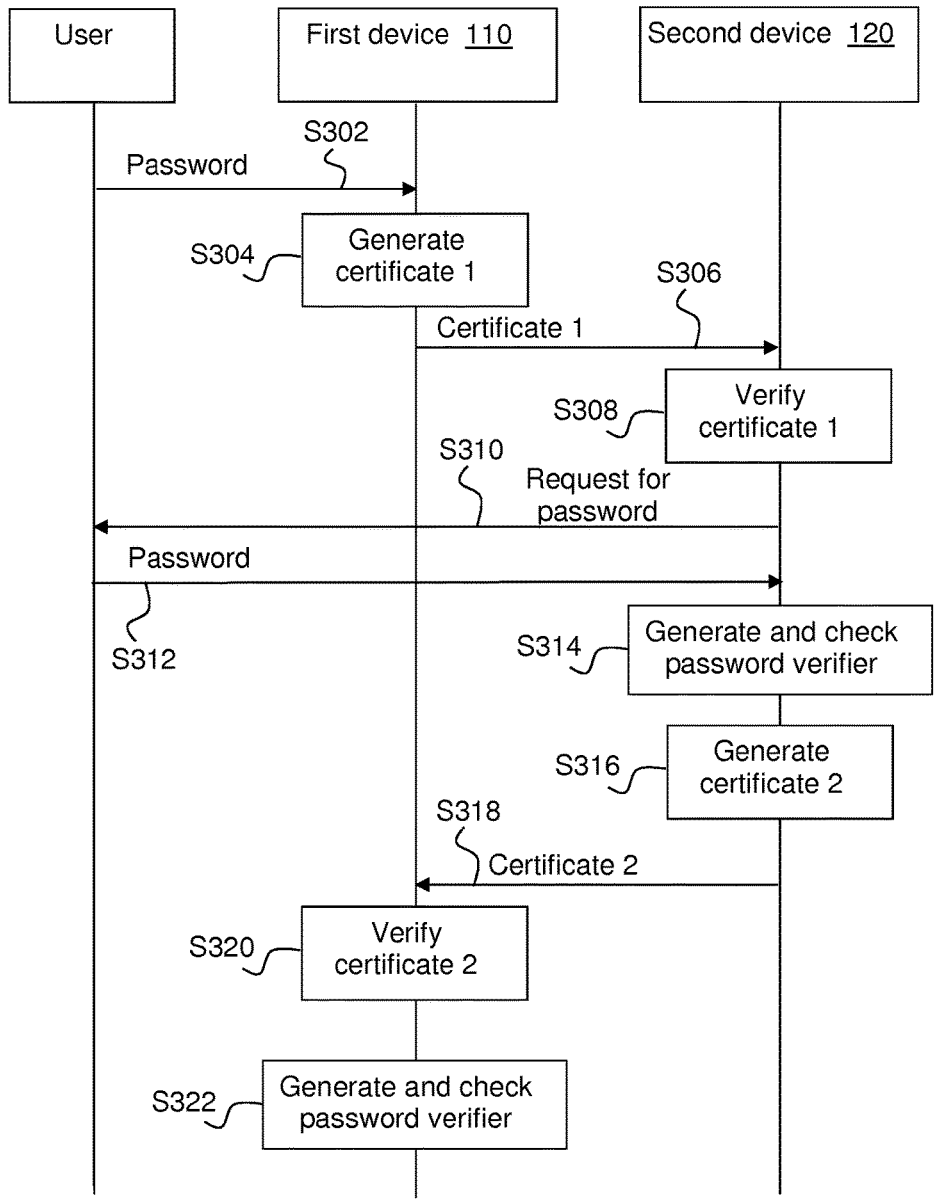
FIG. 3 illustrates mutual device authentication according to a first advantageous embodiment of the present disclosure.

FIG. 3 illustrates device authentication according to a first advantageous embodiment of the present disclosure. In this illustrative example, two devices are paired (i.e. connected) in an ad hoc network.

1. The user inputs S302 its password on the first device 110.
2. The first device 110 generates S304 a certificate, certificate 1, as illustrated in FIG. 2.
3. The first device 110 sends S306 certificate 1 to the second device 120.
4. The second device 120 verifies S308 the signature on certificate 1 using the public key therein. If the signature verification fails, then the second device 120 aborts the authentication (and preferably informs the user).
5. The second device 120 requests S310 the password from the user.
6. The second device 120 receives S312 the password from the user.
7. The second device 120 generates a verification value by applying the one-way function to the unique identifier, the public key and the password (i.e. the same way the first device 110 did it to generate the password verifier in the certificate) and checks S314 that the verification value matches the password verifier extracted from certificate 1. If this is the case, then the user authentication is successful and certificate 1 is stored as a trusted certificate by the second device 120; in case of a mismatch, the authentication fails.

So far, the second device 120 has authenticated the first device 110, but the opposite has not yet happened. To allow this, the method can proceed as follows:

8. The second device 120 generates S316 a certificate essentially as illustrated in FIG. 2, but it will be noted that the second device can reuse the password received from the user for the authentication of the first device 110.
9. The second device 120 sends S318 certificate 2 to the first device.
10. The first device 110 verifies S320 the signature on certificate 2 using the public key therein. If the signature verification fails, then the first device 110 aborts the authentication (and preferably informs the user).
11. The first device 110 generates a verification value by applying the one-way function to the unique identifier, the public key of certificate 2 and the password (i.e. the same way the second device 120 did it to generate the password verifier in certificate 2) and checks S322 that the verification value matches the password verifier. If this is the case, then the user authentication is successful and certificate 2 is stored as a trusted certificate by the first device 110; in case of a mismatch, the authentication fails. It will be noted that the first device 110 can either request the password from the user or reuse the password received to generate certificate 1; however, it is advantageous that there is a relatively short time limit for how long devices store the password before erasing it.

Once the authentication is successful on both devices, certificate-based TLS authentication can take place. The process of TLS mutual authentication between the devices can only be done using certificate 1 and certificate 2 (i.e. the certificates exchanged during the authentication illustrated in FIG. 3). If other keys or certificates are presented, the authentication fails.

In a variant, the user enters the password on one device only (i.e. password is only entered on the first device 110):

1. A first password verification enforcement is done on the first device 110 using certificate 1, i.e. the first device 110 receives the password from the user and uses it to generate an authentication value that is compared with the password verifier. If it fails, the process is aborted.
2. TLS authentication takes place between the first device 110 and the second device 120.
3. Upon successful TLS authentication,
   a) A second password enforcement is done on the first device 110 using the password verifier from certificate 2 (received during the TLS authentication); or
   b) The second password enforcement is done on the second device 120 using the password verifier of the first device 110 (e.g. sent from the first device 110 inside the secure communication channel resulting from the TLS authentication).

In some systems, the secure channel cannot be used for user authentication once it has been set up. In this case, user authentication has to be done outside the secure channel, making passwords susceptible to password sniffing. To overcome this problem, it is possible to use Digest Access Authentication protocol as specified in RFC2069/RFC2617 or augmented Password-Authenticated Key Agreement (PAKE) protocols (as implemented in TLS-SRP), where an attacker sniffing the network does not obtain enough information to login as the user or even to guess a password. The following variant implements Secure Remote Password (SRP protocol, see RFC 2945 for more details).

In this variant, the following parameters are added to the certificate before it is self-signed:
N'=2q+1, which is a safe prime (where also q is prime),
g, a generator mod N', and
A SRP verifier $v=g^{password}$ mod N'.

The SRP password verifier can be made public whereas the password remains secret. In addition, the password verifier is divided in two parts, where $g^{password}$ is a derivate password corresponding to the password:
PV_1=F(password|(N,e)) or F(uid|password|(N,e))
PV_2=F(($g^{password}$,N',q)|(N,e)) or F(uid|($g^{password}$, N',q) |N,e)).

When a device receives a new certificate, it must check that the certificate has been generated by someone who knows the password. This is done before the system is used.
1. The first device 110 sends $A=g^a$, for a random a, to the second device 120.
2. The second device 120 sends to the first device 110 its public key, r=SHA-1 (N', g) and $B=rv+g^b$, for a random b.
3. The two devices compute: s=SHA-1 (A, B)
4. The first device 110 requests the password from the user.
5. The user enters the password on the first device 110.
6. The first device 110 computes a password verifier=SHA-1 (password|public key), checks that r=SHA-1 (N', g), and then generates $K1=(B-rv)^{(a+s \cdot password)}=(g^b)^{(a+s \cdot password)}$. K1 is sent to the second device 120.
7. The second device 120 computes $K2=(A \cdot v^s)^b=(g^a \cdot v^s)^b=(g^{\{a+s \cdot password\}})^b=(g^b)^{(a+s \cdot password)}$. K2 is sent to the first device 110.
8. The two devices check that K1=K2.

Once the devices have computed K1 and K2 and checked that K1=K2, the verification module on each device generates only the second part of the verification value (i.e. the same way the devices generate the password verifier PV_2 put in the certificates) and checks that is equal to PV_2. If successful, each device is assured that the other device's certificate was generated by someone who knows the password without having access to the password in the clear during the authentication.

On the other hand and when the password check is local to the device, the SRP protocol is not necessarily used. In that case, the verification module is able to get the password in the clear. Therefore, the verification module does the following checks:
1— It generates the first part of the password verification value (i.e. the same way the devices generated the password verifier PV_1) and check that is equal to PV_1
2— It generates the SRP verification value from g, N', and the clear password (i.e. the same way it was originally generated) and checks that is equal to v
3— It generates the second part of the verification value and checks that is equal to PV_2

It will thus be appreciated that the present disclosure can provide a way for devices, in the absence of a trusted CA, to perform authentication, in particular in ad hoc networks.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. A device for generating a certificate, the device comprising:
an interface circuit configured to receive any of a password, a pass phrase or biometric data of a user; and
at least one hardware processor configured to:
obtain a public key for a cryptographic algorithm for the device;
generate a verifier by applying a one-way function or an encryption function to a combination of (a) an unique identifier of at least one device or of at least one resource, (b) the public key and (c) a value based on the password, the pass phrase or the biometric data of the user;
generate the certificate comprising the public key and the verifier;
obtain a signature on the certificate thereby obtaining a signed certificate; and
output the signed certificate,
wherein the cryptographic algorithm is an elliptic curve cryptography algorithm.

2. The device of claim 1, wherein the value based on the password, the pass phrase or the biometric data is identical to the password, the pass phrase or the biometric data.

3. The device of claim 1, wherein the cryptographic algorithm is Rivest, Shamir, Adelman (RSA) and the public key comprises a modulus.

4. The device of claim 1, wherein the hardware processor is configured to obtain the signature by signing the certificate using a private key corresponding to the public key.

5. A method for generating a certificate comprising, in at least one hardware processor of a device:
receiving by an interface circuit any of a password, a pass phrase or biometric data of a user;
obtaining a public key for a cryptographic algorithm for the device;
generating a verifier by applying a one-way function or an encryption function to a combination of (a) an unique identifier of at least one device or of at least one resource, (b) the public key and (c) a value based on the password, the pass phrase or the biometric data of the user;
generating the certificate comprising the public key and the verifier;
obtaining a signature on the certificate thereby obtaining a signed certificate; and
outputting the signed certificate,
wherein the cryptographic algorithm is an elliptic curve cryptography algorithm.

6. The method of claim 5, wherein the value based on the password, the pass phrase or the biometric data is identical to the password, the pass phrase or the biometric data.

* * * * *